United States Patent
Mustafa et al.

(12)

(10) Patent No.: US 6,678,831 B1
(45) Date of Patent: *Jan. 13, 2004

(54) MANAGING POWER STATES IN A COMPUTER SYSTEM

(75) Inventors: Mazin A. Mustafa, Houston, TX (US); Michael A. Provencher, Houston, TX (US); Larry W. Kunkel, Houston, TX (US)

(73) Assignee: Hewlett-Packard Development Company, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,123

(22) Filed: Dec. 11, 1997

(51) Int. Cl.[7] .................................................. G06F 1/26
(52) U.S. Cl. ...................... 713/320; 713/300; 713/323; 713/340
(58) Field of Search ................................ 713/300, 320, 713/323, 340

(56) References Cited

U.S. PATENT DOCUMENTS

| 5,083,266 | A | * | 1/1992 | Watanabe ..................... 395/275 |
| 5,247,164 | A | * | 9/1993 | Takahashi ..................... 235/492 |
| 5,396,635 | A | * | 3/1995 | Fung ........................... 395/800 |
| 5,640,573 | A | * | 6/1997 | Gephardt et al. ............. 395/750 |
| 5,752,050 | A | * | 5/1998 | Hernandez et al. ..... 395/750.07 |
| 5,949,853 | A | * | 9/1999 | Resnick ...................... 379/67.1 |
| 5,953,536 | A | * | 9/1999 | Nowlin, Jr. ............. 395/750.05 |
| 6,000,035 | A | * | 12/1999 | Matsushima et al. ....... 713/320 |
| 6,038,671 | A | * | 3/2000 | Tran et al. ................... 713/300 |
| 6,065,121 | A | * | 5/2000 | Hobson et al. .............. 713/300 |
| 6,065,124 | A | * | 5/2000 | Lee ............................. 713/323 |

* cited by examiner

Primary Examiner—Tim Vo

(57) ABSTRACT

A computer system having first and second low power states includes a controller (such as a BIOS routine) that can generate a request to transition to the first low power state (e.g., Suspend state defined in the Advanced Power Management or APM. Standard) in response to activation of predefined events (e.g., a time-out event or a user-initiated event). A program receiving the request can deny the request and instead causes the system to transition to a second low power state (e.g., the APM Standby state).

38 Claims, 4 Drawing Sheets

MANAGING POWER STATES IN A COMPUTER SYSTEM

BACKGROUND

The invention relates to managing power states in a computer system.

In a continuing effort to reduce the amount of power consumed by computer systems, various power management solutions exist. For example, a computer system can be placed into a low power state in response to a predetermined period of inactivity. Thus, if peripheral devices on a computer system have been inactive for the predetermined period, a system management interrupt is generated to invoke a handler that places components in the system in reduced power consumption states (such as shutting off clocks to components, removing power from components, blanking the video display, or spinning down the hard drive).

The Advanced Power Management (APM) Standard (Revision 1.2) defines several levels of power states having different levels of power consumption. The APM standard defines the following power states in decreasing order of power consumption: Full On (no power management); APM Enabled (system is on but unused devices may not be powered); APM Standby (one reduced level of power consumption); APM Suspend (another reduced level of power consumption), and Off (system is not working and power supply is off). In the Standby state, the CPU clock is slowed or stopped, and many devices are placed in a lower power mode; however, most operational parameters are retained so that recovery from the APM Standby state can appear almost instantaneous to the user. In the Suspend state, the system is in a state of greater power savings, in which power can be cut off from most power managed devices, the CPU clock is stopped, the CPU core is in its minimum power state, and clock is stopped (which causes system bus devices to be disabled).

By disabling many of the devices in the system in the APM Suspend mode, a device may be unable to respond to an external event received at an input port of the computer system, or alternatively, the device may receive the event but may be unable to notify the rest of the system of the event (such as by interrupt). As a result, some external events may be missed by the computer system when it is in a low power mode such as the APM Suspend state.

SUMMARY

Generally, the invention is directed to switching to a second low power state even though a first low power state has been requested in a computer system.

The invention may have one or more of the following advantages. By switching the computer system to the second power state rather than the first power state (in which the first power state can be a more reduced power consumption state than the second power state), certain devices can remain enabled so that they can respond to specified events and not miss those events. Power savings can thus be achieved while still maintaining responsiveness of the computer system to specified events.

In general, in one aspect, the invention features a computer system having first and second low power states. The computer system includes a processor, a controller configured to generate a request to transition to the first low power state, and a program executable by the processor and configured to respond to the request by causing the system to transition to the second low power state.

In general, in another aspect, the invention features a method of managing a computer's power state, including generating a request to enter a first low power state. The request to enter the first low power state is denied, and in response to denying the request, a notification is issued to enter a second low prostate.

In general, in another aspect, the invention features a method that generates a request to switch power saving states of a computer from a first state to a second state. The request is acted on by instead switching to a third power state.

In general, in another aspect, the invention features a computer system having a processor, a first program executable by the processor to detect a predefined event and to generate a power savings request in response to detection of the event. A second program executable by the processor intercepts the request and denies the request.

In general, in another aspect, the invention features a computer-readable storage medium for use in a computer system having first and second low power states. The storage medium contains instructions for causing a computer system to generate a request to enter into the first low power state, to deny the request to enter the first low power state, and to issue a notification to enter the second low power state in response to the denying of the request.

Other features and advantages will become apparent from the following description and from the claims.

DETAILED DESCRIPTION

Figure 1:
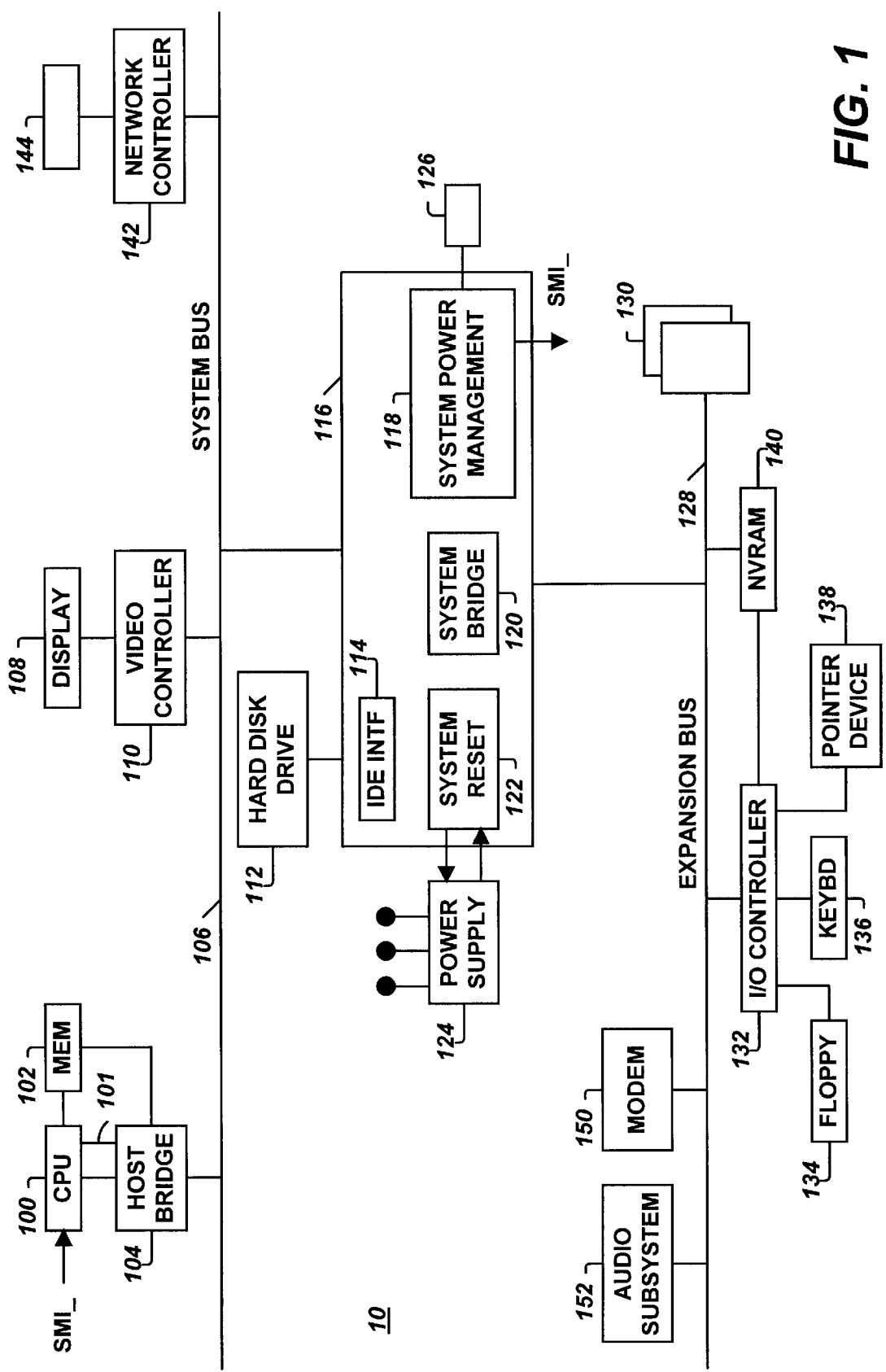
FIG. 1 is a block diagram of a computer system.

Referring to FIG. 1, an exemplary computer system 10 having power management capabilities includes four power levels as defined by the Advanced Power Management (APM) Standard: ON, Standby, Suspend, or OFF. The ON state can be either the APM Full ON state or the APM Enabled state.

The system 10 includes a central processing unit (CPU) 100 and a main memory 102, both coupled to a system bus 106 (which can be, for example, a Peripheral Component Interconnect or PCI bus) through a host bridge 104. Various components are connected to the system bus 106, including a video controller 110 connected to a video display 108 and a network controller 142 connected to a network (not shown) through a interface port 144.

The computer system 10 also includes a system controller 116 (such as the PCI-TO-ISA/IDE XCELERATOR or PIIX4 chip from Intel Corporation) connected between the system bus 106 and an expansion bus 128, which can be, for example, an Industry Standard Architecture (ISA) bus or an Extended Industry Standard Architecture (EISA) bus. The system controller 116 includes a system bridge 120 that provides bridge functions between the system bus 106 and the expansion bus 128. The system controller 116 also includes a hard disk controller 114 that controls a hard disk subsystem 112.

In addition, the system controller 116 includes a system power management controller 118 and a system reset controller 122 that are part of the power management control of the computer system 10. The system reset controller 122 is connected to a power supply 124 of the computer system 10 to control activation of supply voltages to components in the system. The system power management controller 118 includes power management registers that can be set by software (e.g., the system BIOS) to set the computer system 10 hardware to the appropriate power savings states. The power management controller 118 also includes inputs to receive activation of specified events, such as depression of a Bezel or power button 126 located on the computer system housing (not shown) or a time-out event issued by a timer (not shown) that monitors for system activity. Depression of the Bezel button 126 or a time-out event causes the system power management controller 118 to issue a system management interrupt (over line SMI_) to the CPU 100, which in turn causes a system management interrupt handler to be invoked. The system management interrupt handler (which can be part of an APM BIOS routine 210 in the system BIOS 200 shown in FIG. 2) controls switching the computer system power states.

Several bus devices are connected to the expansion bus 128, including expansion slots 130 and an I/O controller 132 having interface ports to a floppy drive 134, a keyboard 136, and a pointer device 138. A modem 150 is connected to the expansion bus 128 to communicate over a telephone line (not shown) to other systems, and an audio subsystem 152 is connected to the bus 128 to provide sound capabilities.

A non-volatile RAM (NVRAM) 140, which can be implemented with an EEPROM or flash memory, is also connected to the expansion bus 128. The NVRAM 140 can store the power-up routines for the computer system 10, including the system BIOS 200. Portions of the system BIOS 200 (such as the APM BIOS routine 210) can also be invoked during operation of the computer system 10, such as in response to a system management interrupt. The APM BIOS routine 210 can communicate with other power management programs (described below) to control the power state of the system 10.

Figure 2:
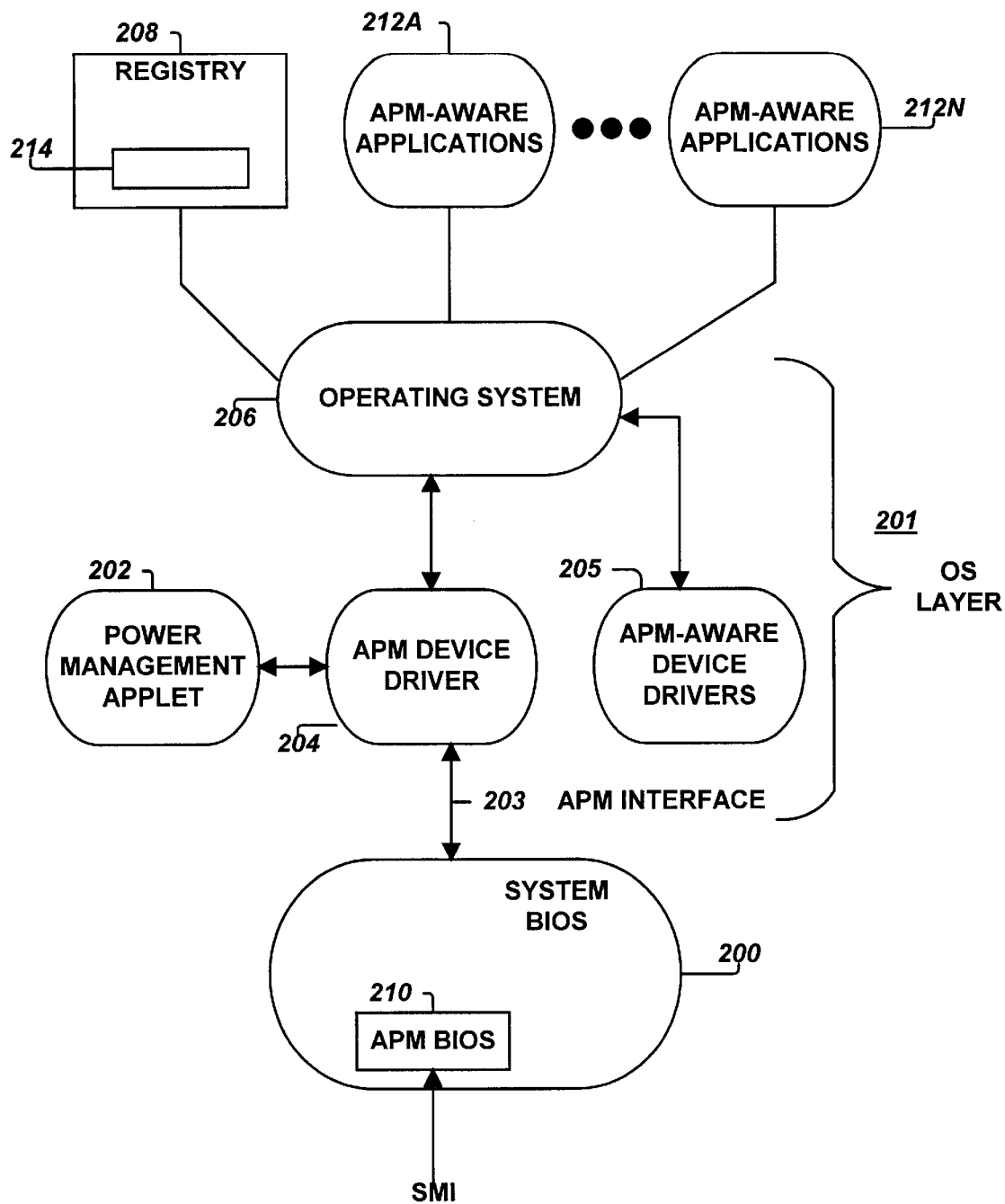
FIG. 2 is a block diagram of software layers in the computer system.

Referring to FIG. 2, power management of the computer system 10 is performed by the APM BIOS routine 210 in the system BIOS layer 200; an APM device driver 204 and an operating system 206 (e.g., Windows 95®) that are part of an operating system layer 201 of the computer system 10; APM-aware device drivers 205 that are also part of the operating system layer 201; a power management applet 202 that can also be considered as part of the operating system layer 201; and APM-aware applications 212A–212N. The APM BIOS 210 acts as the hardware-specific power management module, the APM device driver 204 is the operating system-dependent module that cooperates with the APM BIOS 210 to enforce power management policy, and the APM-aware applications 212 manage corresponding devices in the computer system 10. An APM-aware application 212 can monitor for device inactivity as well as for power management events. Power management events are communicated by the APM device driver 204 to the APM-aware application 212. An APM-aware application 212 can also save device information upon system suspension, which can be restored when the system resumes to its operating state.

Communication between the APM BIOS 210 and the APM device driver 204 occur through an APM interface 203 as defined by the APM Standard. Power management events are communicated from the APM BIOS 210 to the APM device driver 204 through a polling mechanism, in which the APM device driver 204 periodically (e.g., every one second) polls the APM BIOS 210 to determine if there is a power management event that needs to be processed. The APM device driver 204 can also issue function calls to the APM BIOS 210 to notify the APM BIOS 210 of certain requirements and conditions (such as to notify that a request to place the system into a low power state has been accepted).

Figure 3:
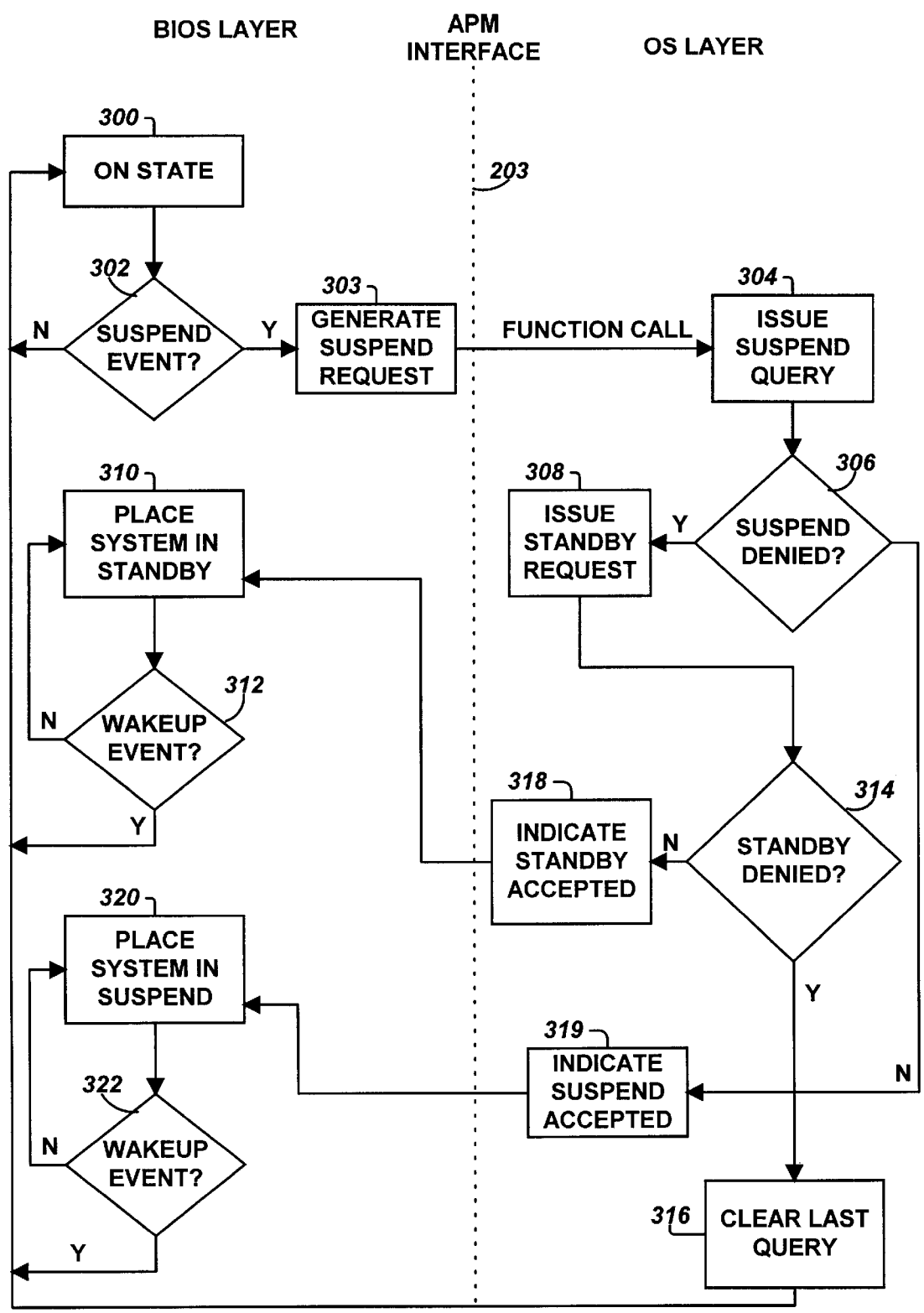
FIG. 3 is a flow diagram of a BIOS routine and an operating system device driver in the computer system.

Referring also to FIG. 3, in response to a time-out event (due to inactivity of system components) or a user-initiated event (e.g., depression of the Bezel button 126) while the system is in the ON state (step 300), an SMI is generated to invoke an SMI handler that is part of the APM BIOS 210. The APM BIOS 210 generates a system suspend request (step 303), which is received by the APM device driver 204 when it polls the APM BIOS 210 through the APM interface 203.

If a suspend request is detected, the APM driver 204 issues a suspend request to all device drivers and APM-aware applications 212 in the computer system 10 (step 304). The APM device driver 204 next determines it the suspend request was denied by the power management applet 202 or by other APM-aware applications or device drivers (step 306).

One function of the power management applet 202 is to prevent the system 10 from switching to the Suspend state if certain conditions exist. One such condition is that a power setting entry 214 in an operating system registry 208 (such as the registry associated with the Windows 95® operating system) is set to predefined values. By appropriately programming the power setting entry 214, the applet 202 can deny all requests to enter the Suspend state, which is advantageous if certain devices in the system 10 need to remain enabled to receive external events and to notify the rest of the system 10 of the external event. One such device is the network controller 142 (FIG. 1), which can receive network messages through a network port 144. If the system 10 is in Suspend mode, a clock 101 from the host bridge 104 to the CPU 100 is disabled, which prevents the CPU 100 from receiving interrupts from system devices (e.g., the network controller 142) in response to receipt of external events.

Thus, if the applet 202, an application 212, or device driver 205 has denied the suspend request, the APM driver 204 issues an APM Standby call to the APM BIOS 210 (step 308). The APM device driver 204 next checks to determine if the Standby request has been denied by an APM-aware device driver 205 (step 314). If not, the APM device driver 204 indicates that the Standby request has been accepted to the APM BIOS 210 (step 318). As a result, the APM BIOS 210 places the computer system 10 into Standby mode (step 310). The APM BIOS 210 disables features of certain devices to reduce power consumption (e.g., blanking the video display 108, spinning down the hard disk drive 112). A halt instruction can also be issued to the CPU 100, which can respond by stopping or reducing the frequency of its internal clocks. In Standby state, the clock 101 to the CPU 100 remains enabled and interrupts on the system bus 106 can be received by the CPU 100. Thus, external events received by the network controller 142 or another device can be processed. The computer system 10 remains in the Standby state until a wake-up event is received (step 312), such as an event generated when a key on the keyboard 136 is pressed, the pointer device 138 is moved, a ring is received by the modem 150, or some type of power button is pressed (e.g., the Bezel button 126).

If the Standby request is denied, then system power savings is denied and the power savings requests are cleared (step 316), and the system 10 remains in the ON state (step 300).

If the suspend request is not denied by the power management applet 202, or an APM-aware application or device driver in step 306, the APM driver 204 a success indication is transmitted by the APM driver 204 to the APM BIOS 210. In response, the APM BIOS 210 places the system into the Suspend state (step 320). The APM BIOS 210 accomplishes this by setting certain power management registers to predefined values in the power management controller 118, which can stop the CPU's clock, disable the audio subsystem 152, and spin down the hard disk drive subsystem 112. The APM BIOS 210 can also program the video controller's power management registers to certain values to place the video display 108 in its lowest power mode and to turn off the RAMDAC in the video controller 106.

The computer system 10 remains in the Suspend state until a wake-up event is received (step 322), at which point the computer system 10 transitions back to the ON state (step 300).

Figure 4:
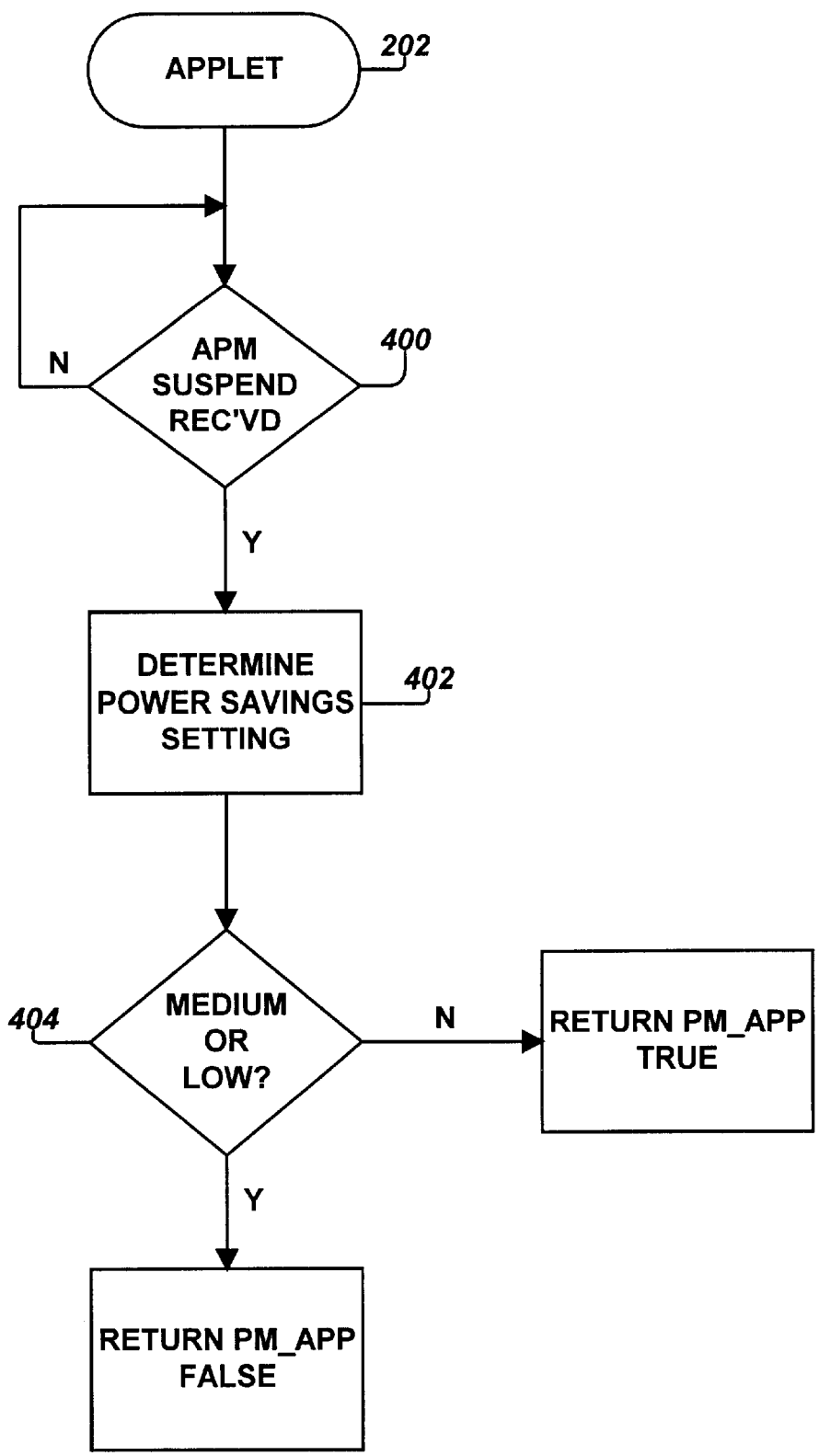
FIG. 4 is a flow diagram of a power management applet in the computer system.

Referring to FIG. 4, the flow of portions of the power management applet 202 is shown. The power management applet 202 determines if an APM suspend query issued by the APM device driver 204 has been received (step 400). If so, the power management applet 202 determines the power saving settings in the operating system registry 208. The power saving settings are set in the registry entry 214, and can include one of three values: high, medium, or low. The power setting entry 214 in the registry 208 can be set by the user through the operating system 206 or automatically by an application. If the power saving setting 214 is set to high, then all suspend and standby requests are accepted. If the setting is at medium, then only standby requests are accepted and suspend requests are rejected. If the setting is low, then all power savings requests are rejected.

Alternatively, power settings can be stored in other storage elements in the system 10.

The power management applet 202 determines if the power setting entry 214 in the registry 208 is set at medium or low (step 404). If so, then a parameter PM_APP is returned false to the APM device driver 204 to indicate that the suspend query should be denied. On the other hand, if the power setting is neither medium nor low (i.e., it is high), the power management applet 202 returns the parameter PM_APP in a true state. The state of the parameter PM_APP is received by the APM device driver 204, which responds accordingly as described in FIG. 3.

In this manner, the applet 202 can control whether the computer system can transition to the APM Suspend state. If certain devices, e.g., a network controller, need to remain enabled (i.e., the devices can notify the rest of the system of a received event), the applet 202 is set to deny all requests to transition to the Suspend state. If Suspend request is denied by the applet 202, the system transitions to an alternative power savings state, which allows some power savings but yet allows certain devices to remain enabled to receive external events and notify the rest of the system of the external event.

Other embodiments are within the scope of the following claims. For example, although APM power states have been described, other computer power states can also be used with embodiments of the invention. The order of steps described for the software routines can be varied and still achieve desirable results. Components in the illustrated computer system are shown connected in a specific manner; other configurations are possible.

What is claimed is:

1. A computer system having first and second low power states wherein computer system power consumption in said first low power state is less than in said second low power state, comprising:

a processor;

a controller configured to generate a request to transition from a higher power state to the first low power state; and a program executable by the processor and configured to respond to the request to transition from said higher power state to the first low power state by denying said request and instead causing the system to transition to the second low power state.

2. The computer system of claim 1, wherein the first and second low power states are defined by the Advanced Power Management standard.

3. The computer system of claim 1, further comprising a device, wherein the device is disabled in the first low power state but enabled in the second low power state.

4. The computer system of claim 1, wherein the controller includes a BIOS routine.

5. The computer system of claim 1, wherein the program includes a power management applet.

6. The computer system of claim 1, further comprising a storage element for storing a power setting, wherein the program is configured to access the stored power setting and to deny the request to enter into the first low power state in response to one condition of the power setting and to grant the request to enter the first low power state in response to a different condition of the power setting.

7. The computer system of claim 1, wherein the controller generates the request to transition to the first low power state in response to a predefined event.

8. The computer system of claim 2, wherein the first low power state is the Suspend state.

9. The computer system of claim 2, wherein the second low power state is the Standby state.

10. The computer system of claim 3, further comprising a bus on which the device is connected, wherein an interrupt from the peripheral device is disabled in the first power state but enabled in the second low power state.

11. The computer system of claim 3, wherein the device includes a network controller.

12. The computer system of claim 6, wherein the storage element includes an operating system registry.

13. The computer system of claim 6, wherein the storage element can be set by a user.

14. A method of managing a computer's power state, comprising:

generating a request to enter a first low power state from a higher power state;

denying the request to enter the first low power state from the higher power state; and in response to the denying of the request to transition to the first low power state from the higher power state, issuing a notification to enter a second low power state in which the computer system power consumption is higher than in the first low power state.

15. The method of claim 14, wherein the request is generated by a BIOS routine.

16. The method of claim 14, wherein the request is denied by an applet pursuant to power settings stored in a memory in the computer.

17. The method of claim 14, wherein the request is generated in response to a system management interrupt.

18. The method of claim 14, further comprising issuing a query to programs to determine whether the computer can enter into the first low power state.

19. The method of claim 14, wherein the first and second power states are defined according to the Advanced Power Management Standard.

20. The method of claim 18, wherein the programs include applications and device drivers.

21. The method of claim 19, wherein the first power state includes a Suspend state.

22. The method of claim 19, wherein the second power state includes a Standby state.

23. A method comprising:
generating a request to switch power saving states of a computer from a first power state to a second power state; and
acting on the request to switch from the first power state to the second power state by, instead switching from the first power state to a third power state, wherein the first power state permits higher power consumption the third power state and the third power state permits higher power consumption than the second power state.

24. The method of claim 23, wherein the second power state includes a suspend state.

25. The method of claim 24, wherein the third power state includes a standby state.

26. A computer-readable storage medium for use in a computer system having first and second low power states, the storage medium containing instructions for causing a computer system to:
generate a request to enter into the first low power state from a higher power state;
deny the request to enter into the first low power state from the higher power state; and
in response to the denying of the request to enter into the first low power state to issue a notification to enter the second low power state from said higher power state, wherein the first low power state permits lower power consumption than the second low power state.

27. The computer-readable medium of claim 26, wherein the first low power state includes an Advanced Power Management Suspend state.

28. The computer-readable medium of claim 26, wherein the second low power state includes an Advanced Power Management Standby state.

29. A computer system having operating states including a normal state, a low power state in which power consumption is less than in said normal state, and a lower power state in which power consumption is less than in said low power state, said system comprising:
a processor;
a controller configured to generate requests to transition from one of said states to another one of said states; and
a program executable by said processor and configured:
to respond to a first predetermined request generated by said controller to transition from said normal state to said lower power state by implementing said transition if the computer system is in a predetermined functional condition; and
to respond to said first predetermined request generated by said controller to transition from said normal state to said lower power state by causing the system to transition to said low power state instead of to said lower power state if the computer system is not in said predetermined functional condition.

30. The computer system of claim 29, wherein in said low power operating state the processor is clocked at a lower rate than in said normal operating state, and wherein in said lower power operating state the processor is not clocked.

31. A computer having operating states including an on state, a SUSPEND state in which power consumption is less than in said on state, and a STANDBY state in which power consumption is less than in said SUSPEND state, said system comprising:
a processor;
a controller configured to generate requests to transition from one of said states to another one of said states; and
a program executable by said processor and configured:
to respond to a first predetermined request generated by said controller to transition from said on state to said SUSPEND state by implementing said transition if the computer system is in a predetermined functional condition; and
to respond to said first predetermined request generated by said controller to transition from said on state to said SUSPEND state by causing the system to transition to said STANDBY state instead of to said SUSPEND state if the computer system is not in said predetermined functional condition.

32. A computer system comprising:
a processor operable in different power consumption modes including a normal operating mode;
a controller configured to generate requests to transition between said different power consumption modes; and
a program executable by said processor and configured:
to respond to and implement a first predetermined request generated by said controller to transition said processor to a minimal power consumption state if the computer system is in a predetermined functional condition; and to respond to said first predetermined request generated by said controller to transition said processor to said minimal power consumption state by causing said processor to transition to a low power consumption state if the computer system is not in said predetermined functional condition, said processor power consumption in said low power consumption mode being less than in said normal operating mode but greater than in said minimal power consumption mode.

33. A computer system comprising:
a processor operable in different power consumption modes;
a controller configured to generate requests to transition between said different power consumption modes; and
a program executable by said processor and configured to respond to a predetermined request generated by said controller to transition said processor to a minimal power consumption state from a higher power consumption state by not implementing said request and instead causing said processor to transition to a low power consumption state in which said processor power consumption is greater than in said minimal power consumption mode but less than in said higher power consumption state.

34. A computer system comprising:
a processor coupled to a bus and operable in different power consumption modes including a normal operating mode in which said processor is clocked at a predetermined clock speed;
a device coupled to said bus and operable to communicate commands from said bus to said processor when in said normal operating mode;
a controller coupled to said bus and configured to generate requests to transition between said different power consumption modes; and a program executable by said processor and configured to respond to a first predetermined request generated by said controller to transition said processor from said normal operating mode to a minimal power consumption state in which said processor is not clocked and communication between said device and said processor is disabled by:

(a) implementing said first predetermined request when the computer system is in a predetermined functional condition; and (b) when the computer system is not in said predetermined functional condition, denying said request and causing said processor to transition from said normal operating condition to a low power consumption state in which said processor is clocked at a reduced speed and communication between said device and said processor is enabled.

35. A computer system comprising:

a processor operable in different power consumption modes including a normal operating mode;

a first program executable by said processor and configured to respond to a predetermined event to cause a device driver to generate a BIOS request to transition the system from said normal operating mode into a minimal power consumption state;

a second program executable by said processor and configured to respond to a predetermined condition to deny a said BIOS request and instead to cause said device driver to issue a BIOS call to transition the system from said normal operating mode into an intermediate low power consumption state in which said processor power consumption is less than in said normal operating mode but greater than in said minimal power consumption mode.

36. The computer system of claim 35, wherein said minimal power consumption state is an Advanced Power Management Suspend state.

37. The computer system of claim 35, wherein the first program is invoked by a system management interrupt in response to a said predetermined event.

38. The computer system of claim 35, wherein said intermediate low power state is an Advanced Power Management Standby state.

* * * * *